United States Patent

Torres

[15] 3,672,599

[45] June 27, 1972

[54] TAPE STORAGE BUFFER

[72] Inventor: Mario A. Torres, Anaheim, Calif.

[73] Assignee: California Computer Products, Inc., Anaheim, Calif.

[22] Filed: Aug. 14, 1970

[21] Appl. No.: 63,872

[52] U.S. Cl. ............................................242/184, 226/118

[51] Int. Cl. ..............G11b 15/06, G11b 15/58, G11b 23/12

[58] Field of Search ...............................242/183, 184–188; 250/219 L; 274/4, 11; 226/49–51, 95, 97, 118, 119

[56] References Cited

UNITED STATES PATENTS 3,545,700 12/1970 Klang..................................242/184

*Primary Examiner*—Leonard D. Christian

*Attorney*—John A. Duffy and Bruce D. Jimerson

[57] ABSTRACT

Variable center positioning can be used to increase the effective storage length of a vacuum buffer chamber. Both position and velocity are controlled in accordance with the direction of capstan rotation so as to maintain the loop at the top or bottom of the vacuum chamber.

4 Claims, 11 Drawing Figures

INVENTOR.

BY Mario A. Torres

Bruce D Jimerson
ATTORNEY

INVENTOR.
Mario A. Torres
BY

ATTORNEY

INVENTOR.
Mario A. Torres
BY
Bruce D. Jimerson
ATTORNEY

INVENTOR.
Mario A. Torres
BY
Bruce D. [signature]
ATTORNEY

INVENTOR.
Mario A. Torres
BY
Bruce D Jimerson
ATTORNEY

TAPE STORAGE BUFFER

BACKGROUND OF THE INVENTION

In a typical computer tape system, the high inertia storage reels are isolated from one another using one or more buffer vacuum columns. This allows the tape at the capstan to be rapidly stopped and started, while the reels follow with the lower acceleration rates. In prior art systems the tape is positioned about the geometric center of the column to provide buffer against motion in either direction. In the present system the tape is positioned about a center which varies according to the capstan command direction. The advantage of a tape storage column with a variable center over prior art systems may be epitomized as follows: (a) up to 100 percent increase in the effective length of the vacuum column, which reduces the weight and dimensions of the overall system, and (b) up to 50 percent reduction in the reel-motor acceleration requirements. Equivalent performance characteristics may be achieved with less power consumption and hardware cost.

SUMMARY OF THE INVENTION

The variable center vacuum storage chamber utilizes a three section sensor array to control the velocity and position of tape within the vacuum column in accordance with externally supplied control commands. A photocell array selector is used to select the proper photocell depending upon the applied command. Positioning of the tape at the top or bottom of the column is achieved by actuating the reel servos in response to the commanded direction of capstan rotation. Delay circuitry is provided to assure that the proper tape center is reached before the capstan servo is actuated.

DESCRIPTION OF A PREFERRED EMBODIMENT

Figure 1:
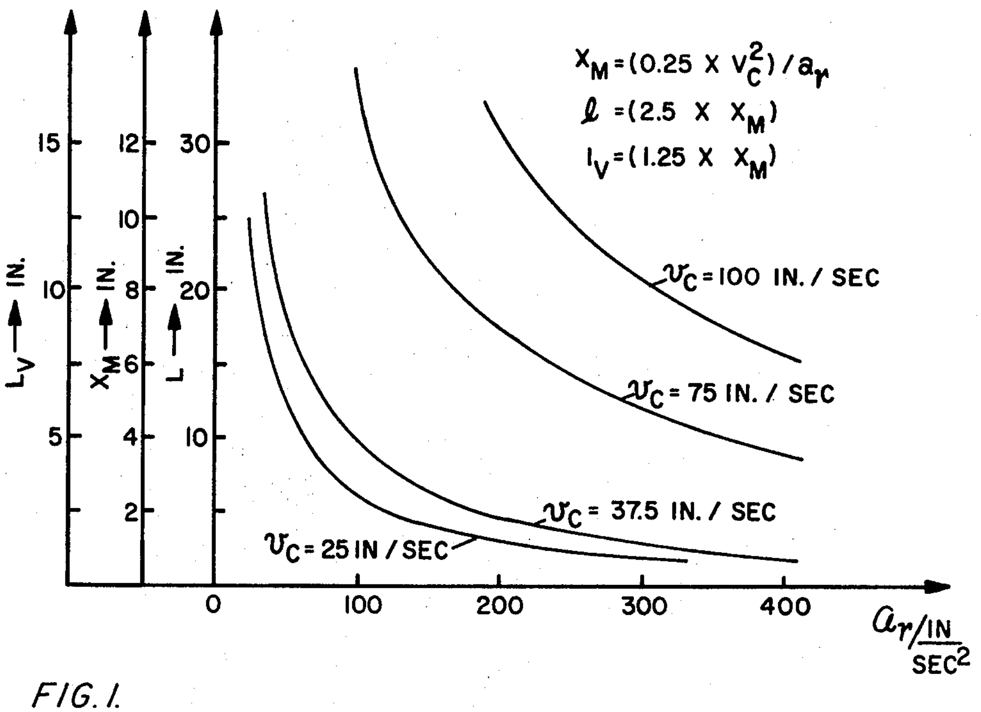
FIG. 1 is a graph showing the tape loop excursion and storage length of the present and prior art devices as a function of reel acceleration with capstan velocity as a parameter.

FIG. 1 shows the required storage length (L) of the vacuum column as a function of the reel acceleration ($a_r$), with the capstan speed ($v_c$) as parameter. $X_M$ is the maximum tape loop excursion and $L_r$ is the required vacuum chamber length when the variable center device is used. In most tape reel servo systems the position and velocity of the tape loop are detected by some type of sensor (such as a photoelectric device) and the output is applied to a servo system in order to maintain the tape at or near the geometrical center of the vacuum column. The required vacuum chamber length for such conventional devices is given by $L = 2.5(X_M)$.

In the present invention a variable center system is used to control the position and velocity of the tape loop in order to maintain it as close as possible to the top or to the bottom of the vacuum chamber, depending upon the direction in which the capstan is commanded. The required vacuum chamber length is given by $L_v = (1.25)(X_M)$. If the maximum tape loop excursion ($X_M$) during the start or stop time is, for example, 4 inches, the required vacuum length (L) for prior art systems will be 10 inches, requiring a reel motor acceleration ($a_r$) of approximately 100 in/sec$^2$ for a capstan speed of 37.5 in/sec and 12 milliseconds start and stop time. Using the control system described in this disclosure, the required vacuum length ($L_v$) will be only 5 inches for a reel acceleration of 100 in/sec$^2$. If a vacuum column of 10 inches is available, the required reel acceleration will be less than 50 in/sec$^2$.

Figure 2:
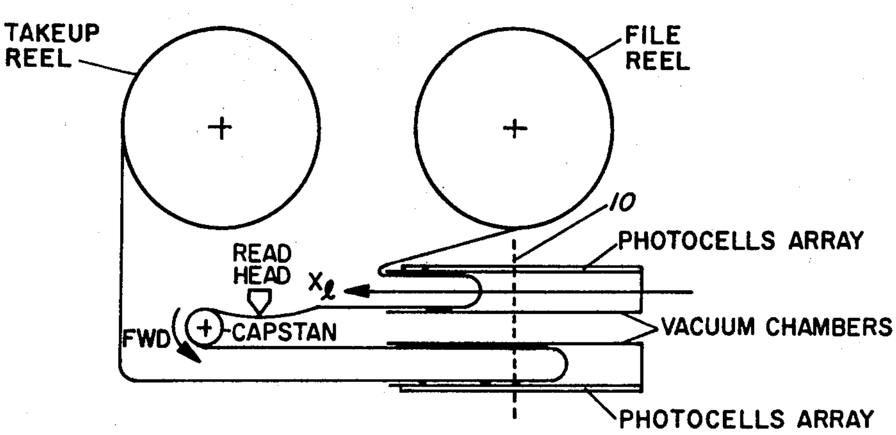
FIG. 2 is a diagram illustrating a typical single capstan vacuum buffer unit.

FIG. 2 shows the basic configuration of a single capstan, vacuum storage magnetic tape unit. The description will be limited to the control circuit of the file reel, since both file and takeup reel circuits are identical. During the start time of the forward motion of the capstan the speed of the tape loop $X_L$ is assumed to be positive. When the reverse motion of the capstan starts, the loop speed is assumed to be negative. At the geometrical center 10 of the vacuum column $X_L$ is equal to zero.

Figures 3, 4:
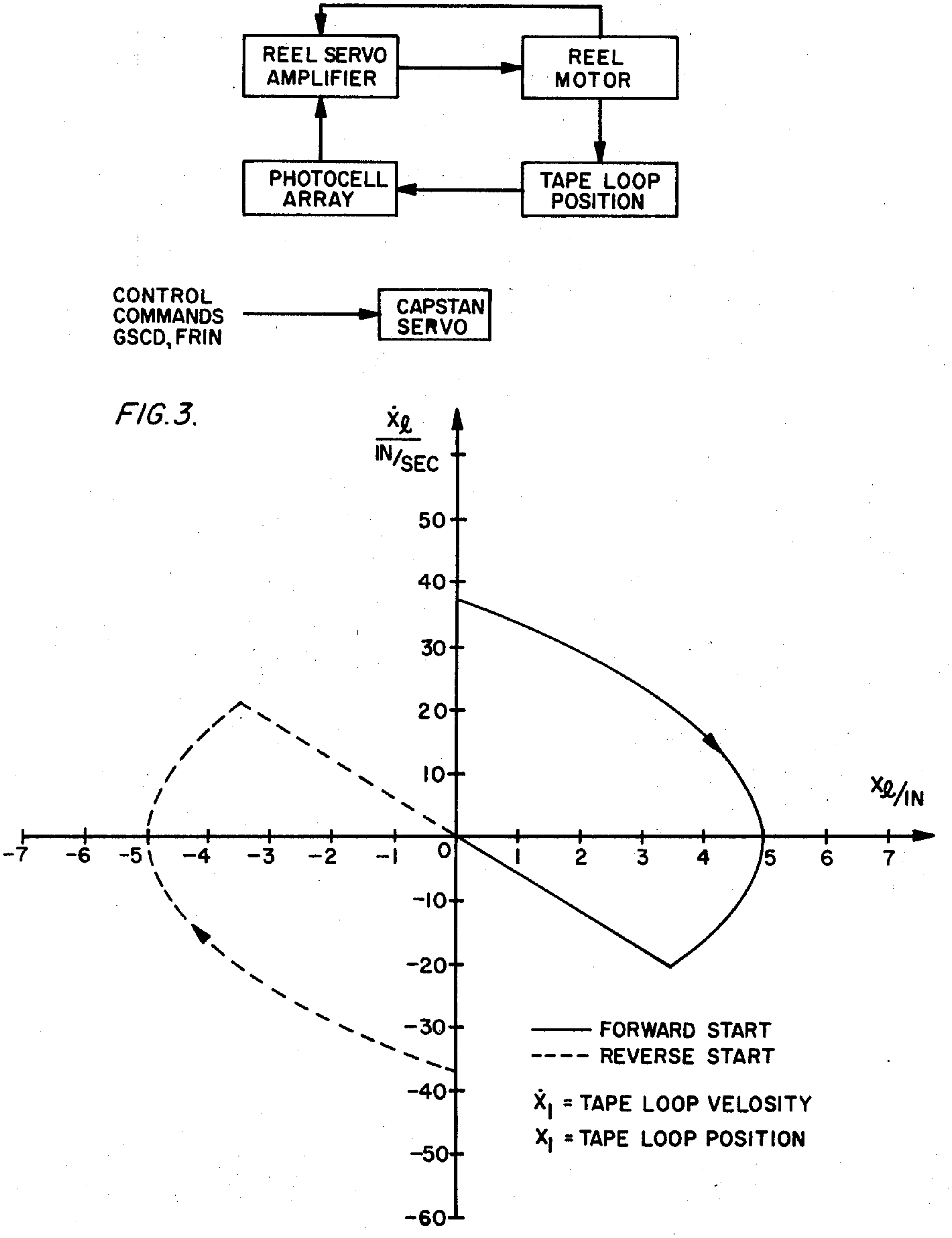
FIG. 3 is a block diagram illustrating the operative relationship between the elements of a conventional fixed center reel servo system.
FIG. 4 is a phase plane diagram of a conventional fixed center servo system.

FIG. 3 shows the principle of operation of the reel servo system with fixed vacuum chamber center. The output of the photocell array is applied to the reel servo amplifier. This will energize the reel motor if either the loop position $X_1$ or the loop speed $X_1$ is not equal to zero. The control commands (GSCD = run, stop; FRIN = forward, reverse) are applied directly to the capstan servo system.

FIG. 4 shows the loop speed as a function of the loop position (phase diagram). The capstan speed is assumed to be $v_c =$ 75 in/sec and the maximum tape loop excursion $X_M = 5$ inches. According to FIG. 1 the required length of the vacuum chamber is 12.5 inches and the reel acceleration $a_r = 280$ in/sec$^2$.

Figure 5:
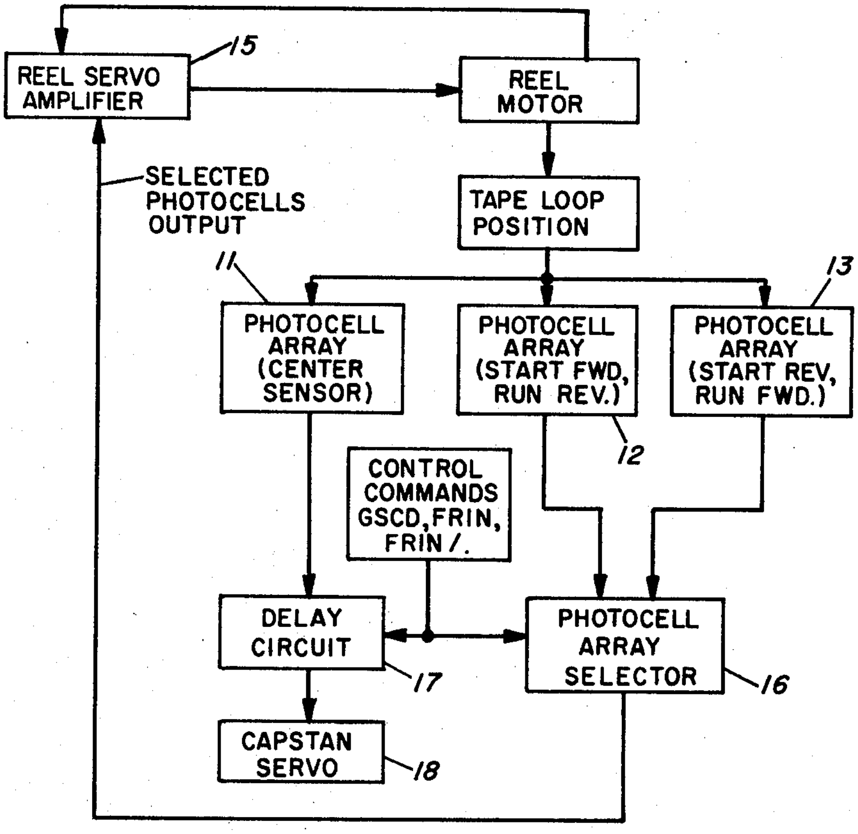
FIG. 5 shows a block diagram of the operative elements of the variable center system.

FIG. 5 represents the principle of operation of the control system with variable center. The photocell array is now divided into three portions, 11, 12 and 13. Photoelectric sensor 12 is used for the forward start and run reverse and photoelectric sensor 13 is used for the reverse start and run forward motion. Their outputs are proportional to the loop position in the vacuum chamber. The reel servo amplifier 15 received only the selected photocell output. The selection is provided by the photocell array selector 16 which receives the control commands forward, reverse and run. The control commands are also applied to the command delay circuit 17. When a run command is given, the photocell array selector 16 selects the photocell output for forward or reverse start depending on the received direction command. As a result the photocell center, i.e., the $X_1 = 0$ position, will be selected and the reel servo will bring the tape loop to the new center which corresponds to either start forward ($O_F$) or start reverse ($O_R$) motion. When the tape loop reaches the selected center, the photocell center sensor 11 will transfer the start commands to the capstan servo 18 releasing the delay circuit 17. The start forward (reverse) command will cause a positive (negative) tape loop velocity but the stop forward (reverse) command will generate a negative (positive) tape loop velocity (file reel). This requires a second change of center after the start commands are released. This change is again provided by the photocell array selector 16 and the center sensors.

Figure 6:
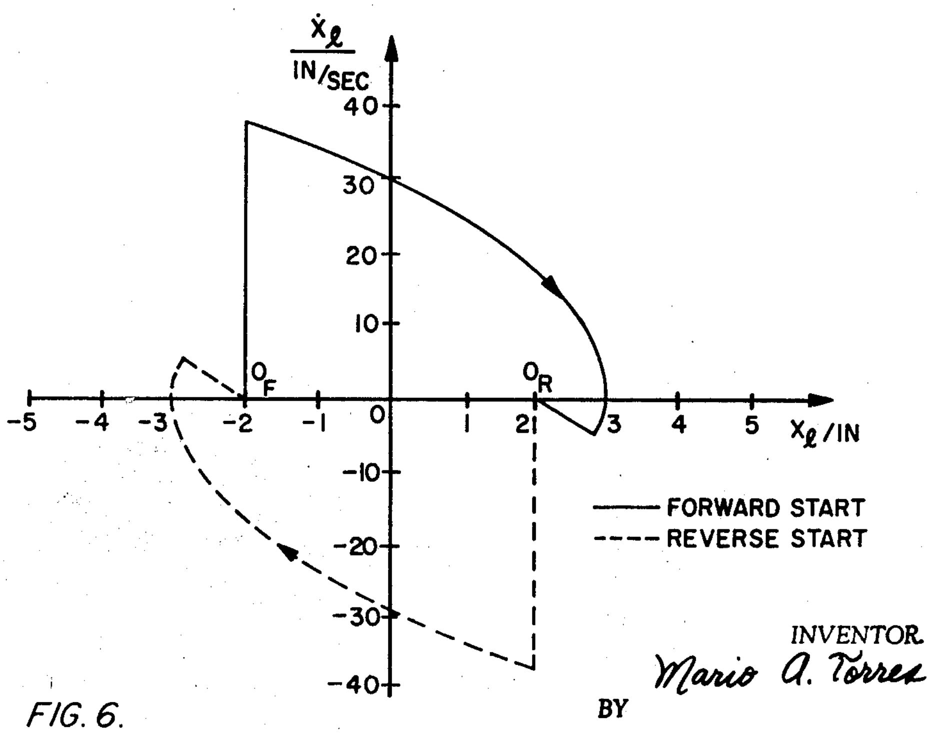
FIG. 6 is a phase plane diagram of the variable center servo system.

FIG. 6 shows the phase diagram for the variable center operation for a capstan speed of 75 in/sec and a maximum loop excursion of 5 inches. $O_F$ is the start forward (run reverse) and $O_R$ is the start reverse (run forward) photocell center.

AccordinG to FIG. 1 the required length of the vacuum chamber is 6.25 inches and the reel acceleration $a_r = 280$ in/sec$^2$. Using a safety factor of 30 percent, the required vacuum column length will be 8 inches.

In FIG. 4 the effective vacuum chamber length ($L_{eff}$) is given by $L_{eff} = (X_M/L) \times 100\% = (5.0/16/0) \times 100\% = 31.2\%$, whereas in FIG. 6 the effective vacuum chamber length ($L_{eff}$) is equal to $(5.0/8.0) \times 100\% = 62.4\%$.

Figure 7:
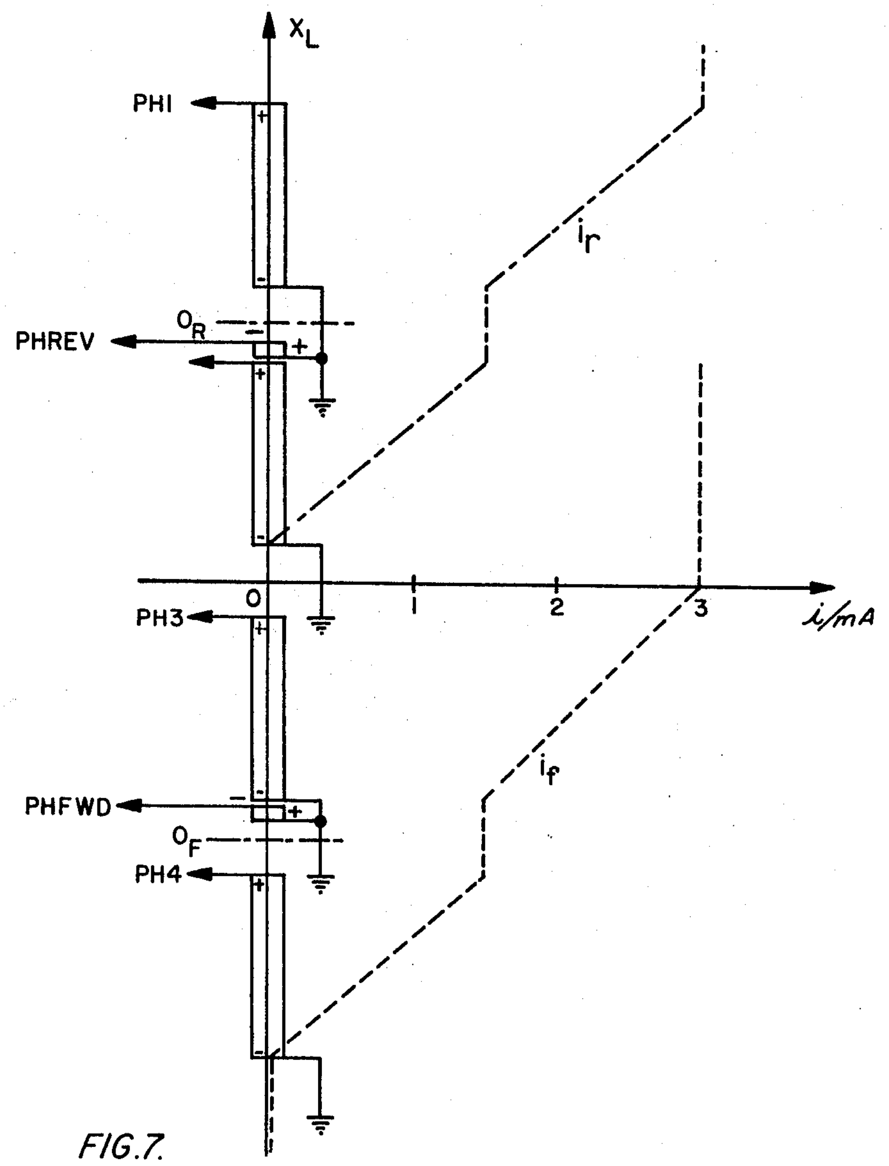
FIG. 7 is a schematic diagram of a typical mercury latching relay which can be used as a photocell array selector.

FIG. 7 shows the photocell array configuration and the current output characteristic as a function of $X_L$. PH1 thru PH4 are the loop position sensor outputs. PHFWD and PHREV are the outputs of the photocell center sensors. PH1 and PH2 submit the photocell array output for start forward and run reverse conditions.

Figure 8:
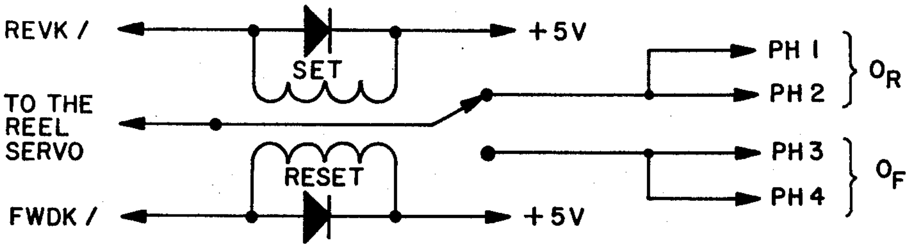
FIG. 8 shows a schematic representation of a mercury film latching relay which can be used as a photocell array selector.

The photocell array selector is typically a mercury film latching relay like the type shown in FIG. 8. The relay is set or reset when either REVK/ or FWDK/ is at ground potential. Once positioned the mercury films maintain contact without application of power.

Figure 9:
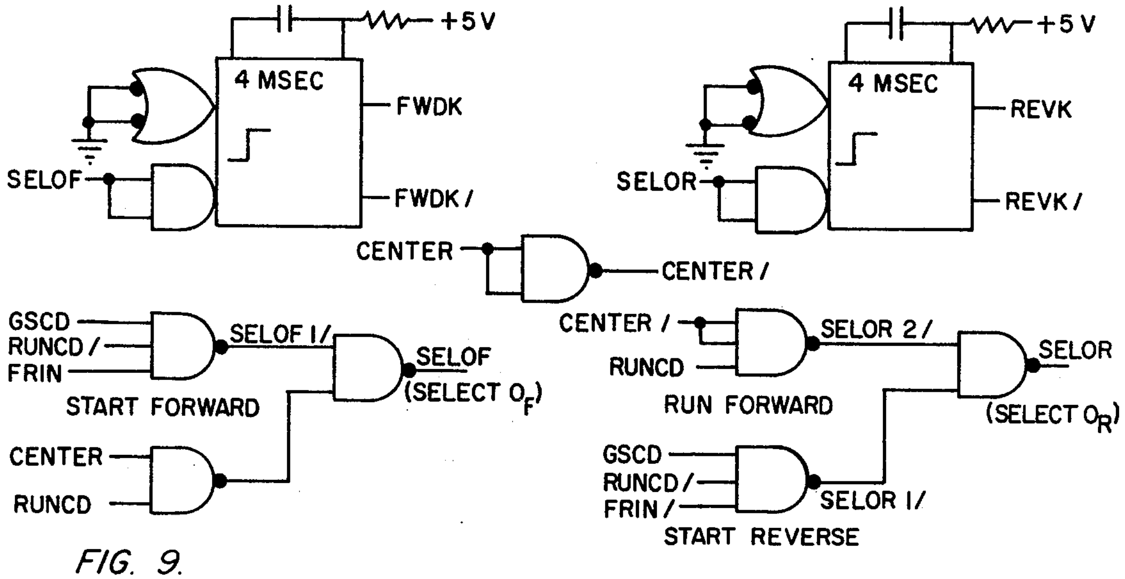
FIG. 9 is a block diagram of the logic circuitry for the photocell array selector.
Figure 10:
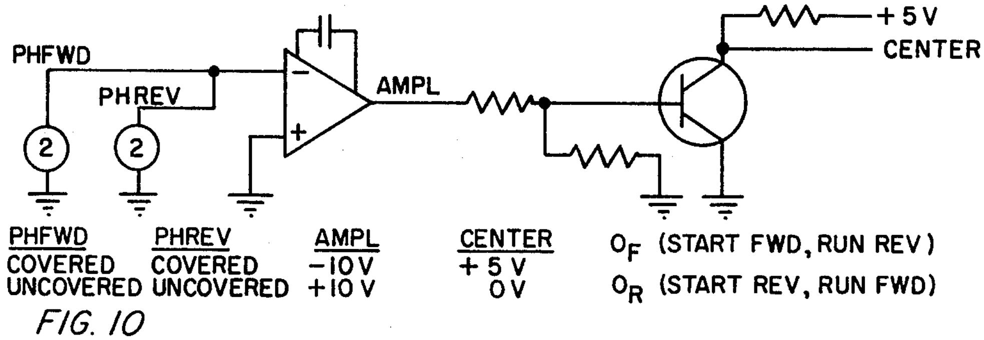
FIG. 10 is a block diagram of the photocell center sensor circuitry.

The logic circuit for the photocell array selector is shown in FIG. 9, and FIG. 10 shows the photocell center sensor circuit. AMPL is − 10 V and CENTER is + 5 V when the tape loop covers both center sensors PHFWD and PHREV. This is the necessary condition for the start reverse and run forward center selection.

Figure 11:
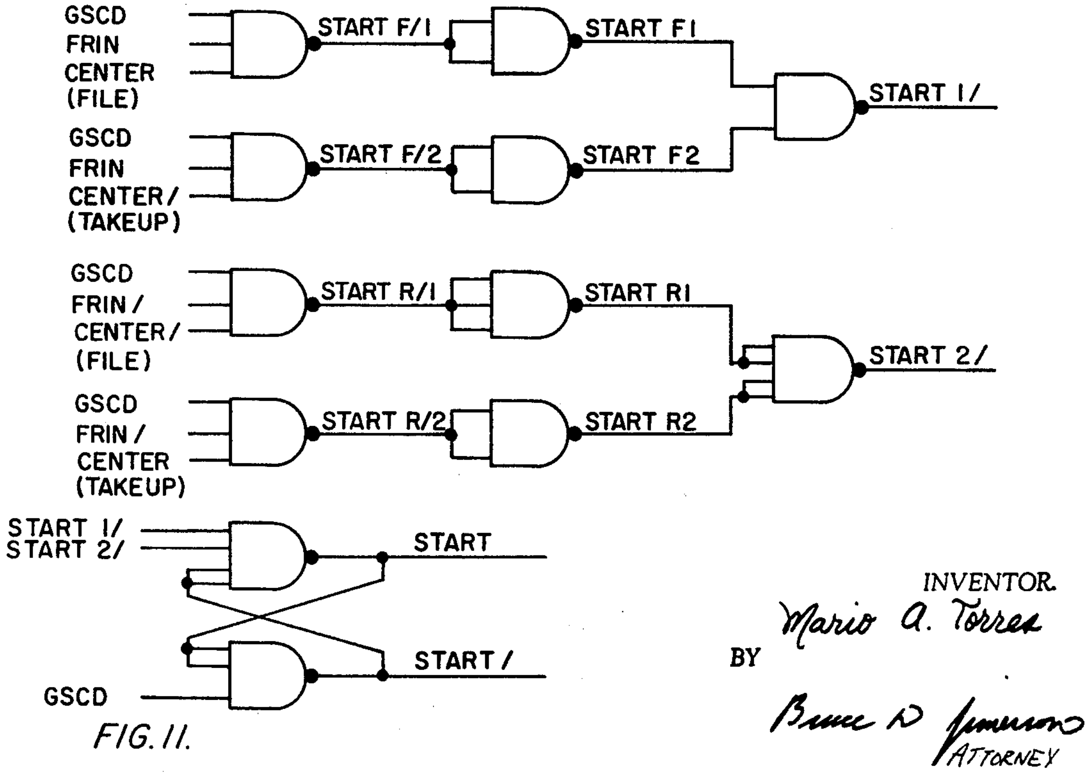
FIG. 11 is a block diagram of the command delay circuitry.

FIG. 11 shows the command delay circuit. The run forward command from the controller is given by GSCD = FRIN = +5, i.e. when both center sensors PHFWD are covered. This is the indication for the proper selection of the center and the right position of the tape loop.

The run reverse command from the controller is given by GSCD = +5V and FRIN = 0V or FRIN/ = +5V. This command will be transferred to the capstan servo as soon as center becomes 0V which indicates the right position of the tape loop.

Although a preferred embodiment of the invention has been shown and illustrated in detail, it will be understood that the invention is not limited thereto, and that numerous changes, modifications and substitutions may be made without departing from the spirit of the invention.

I claim:

1. A variable center capstan drive tape storage buffer system comprising:

means for detecting the direction in which the capstan is commanded to rotate;

means responsive to said means for detecting the direction of capstan rotation for varying the tape loop center relative to the geometric center of said buffer in accordance with the direction of capstan rotation.

2. The apparatus recited in claim 1 wherein is included:

means for delaying the time for actuating said capstan to move the tape until the new loop center has been achieved.

3. The apparatus recited in claim 2 wherein said means for varying the tape loop center comprises:

a sensor array for establishing at least two tape loop operating centers at different locations relative to said buffer;

a sensor array selector for selecting the output of one of said sensors;

a pair of tape reels for storing tape;

means for actuating the tape reels in response to the selected sensor.

4. The apparatus recited in claim 3 wherein said means for delaying the time for actuating said capstan comprises a center sensor for detecting that the tape has reached a new center defined by the sensor which has been selected by said sensor array selector.

* * * * *